United States Patent [19]
Nauth

[11] 3,972,620
[45] Aug. 3, 1976

[54] AZIMUTH ANGLE MEASURING APPARATUS

[75] Inventor: Hans Georg Nauth, Mainz, Germany

[73] Assignee: International Business Machines Corporation, Armonk, N.Y.

[22] Filed: Sept. 11, 1975

[21] Appl. No.: 612,611

[30] Foreign Application Priority Data
Oct. 12, 1974   Germany............................ 2448743

[52] U.S. Cl................................. 356/150; 356/144; 356/153; 356/154
[51] Int. Cl.² ..................... G01B 11/27; G01C 1/00
[58] Field of Search ........... 356/138, 140, 150, 151, 356/153, 154, 172; 178/6.6 DD

[56] References Cited
UNITED STATES PATENTS

| | | | |
|---|---|---|---|
| 3,485,561 | 12/1969 | Ewald .................................. | 356/154 |
| 3,684,384 | 8/1972 | Hojo et al. ........................... | 356/154 |
| 3,695,767 | 10/1972 | George et al. ........................ | 356/154 |

OTHER PUBLICATIONS

Parkes, G. L. "Optical Plumb Bob", IBM Tech. Disclosure Bull. vol. 2, No. 4, 12-1959, p. 130.

Whitefield, R. J. "Differential Angular Orientation Measurement Device", IBM Tech. Disclosure Bull. vol. 16 No. 6, 11-1973, pp. 2018-2019.

*Primary Examiner*—John K. Corbin
*Assistant Examiner*—Wm. H. Punter
*Attorney, Agent, or Firm*—James A. Pershon

[57]            ABSTRACT

A straight line whose azimuth angle is to be measured, such as the angle of a gap of a magnetic head assembly relative to a disk radius, is imaged on an evaluation plane via a lens and a pair of deflecting mirrors, the first of which is semi-transparent. The mirrors are each inclined at a different angle from a common pivot line. The angular difference is such that the images do not touch and only one end portion of each image from the mirrors lies in the image field. The lateral spacing of these end portions is a function of the azimuth angle. A mask blocking out the center portion of the image may be used to assist in the end portion definition.

5 Claims, 11 Drawing Figures

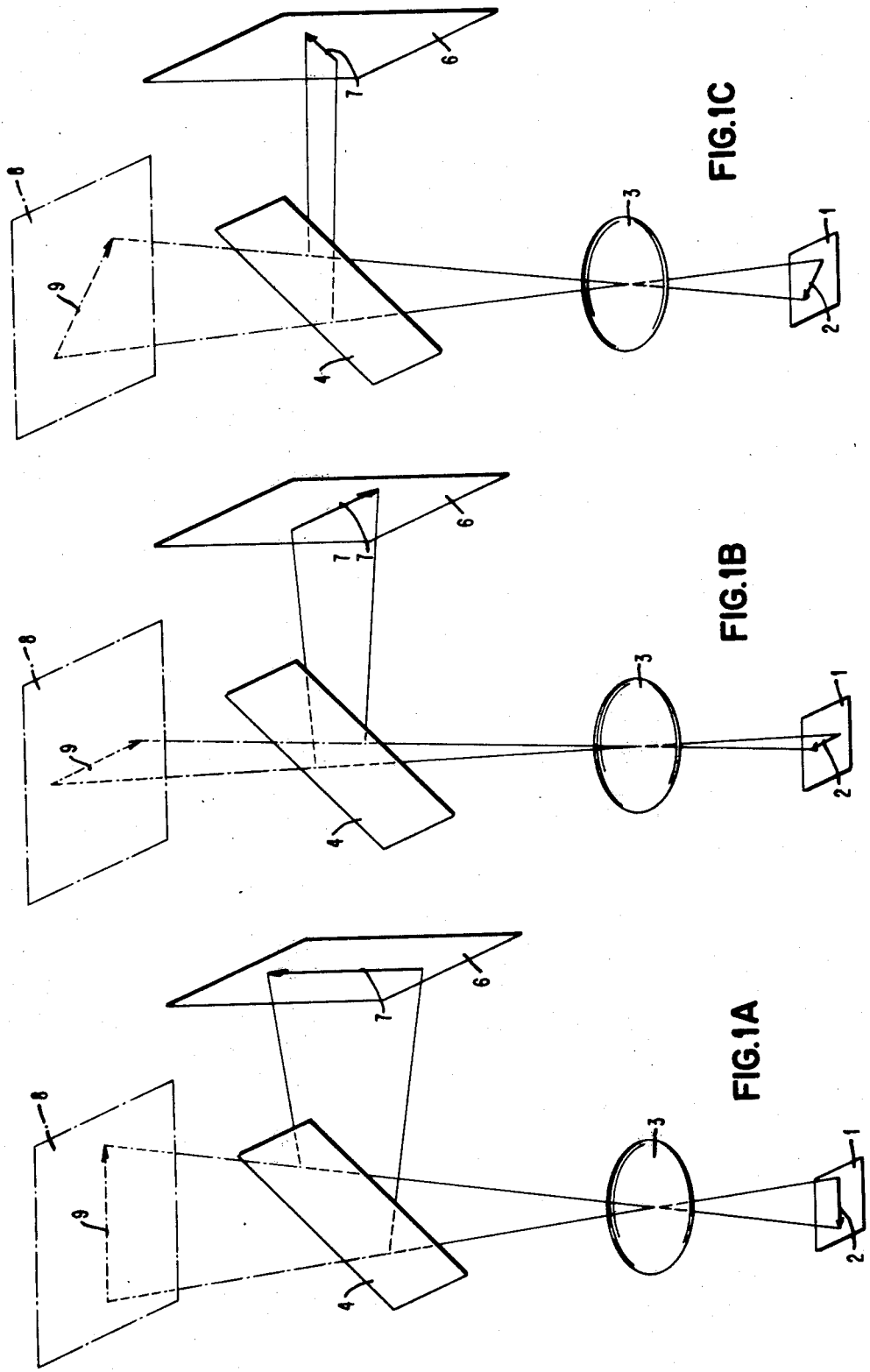

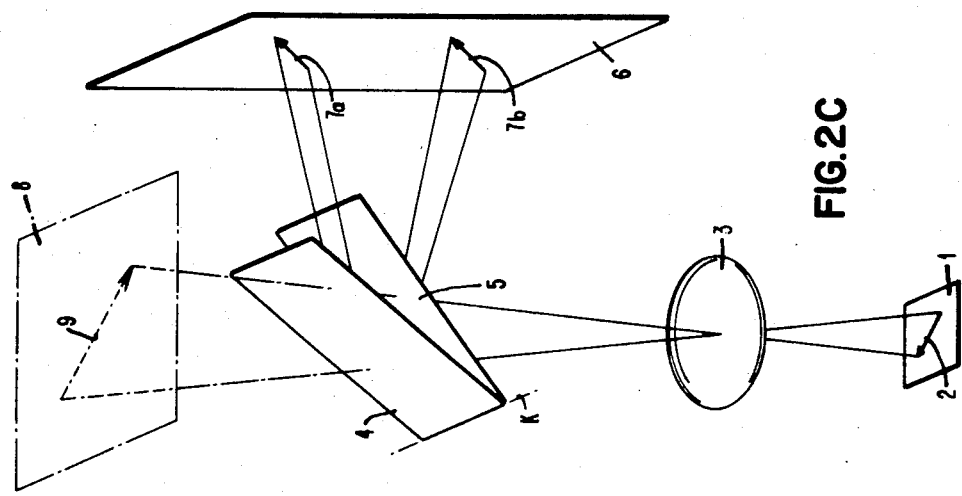
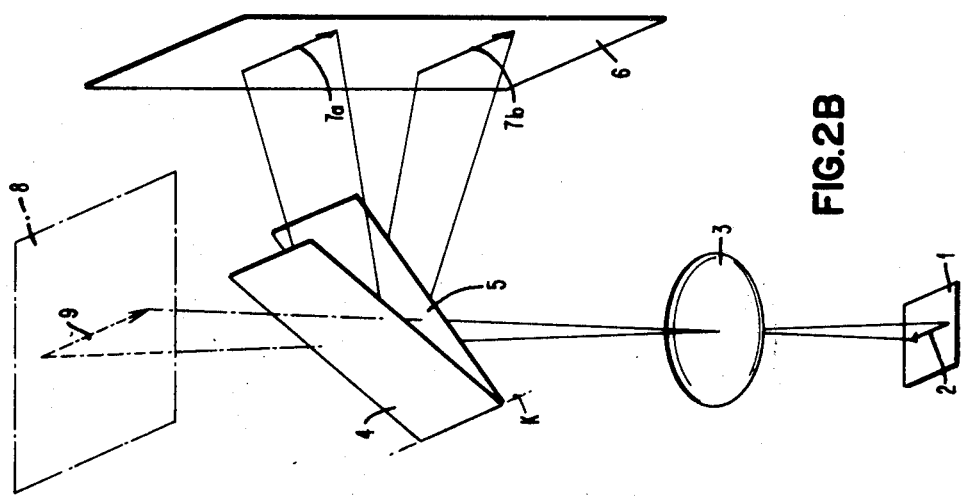
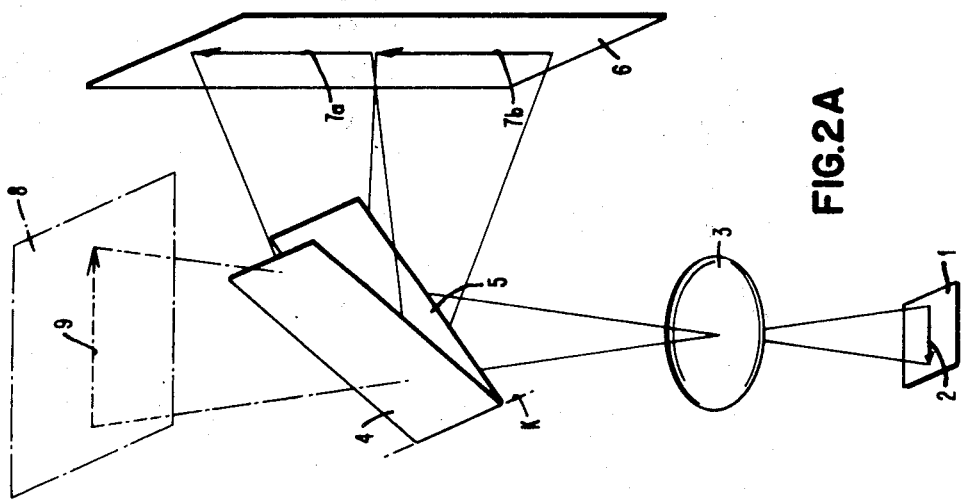

3,972,620

AZIMUTH ANGLE MEASURING APPARATUS

BACKGROUND OF THE INVENTION

This invention relates generally to apparatus for measuring and testing using optics and in particular to an optical measuring device for measuring angles using plural images.

1. Field of the Invention

In the manufacture and adjustment of precision devices, for instance in the adjustment of the magnetic heads of magnetic disk storage devices, two or more axes frequently have to be aligned with respect to each other. The alignment could be where the axes must be in parallel, vertically spaced, or at an angle relative to each other. The particular problem in the adjustment of the magnetic heads of magnetic disk storage devices, especially with the very high storage density of present day devices, is that the admissable deviation from parallelism between the read/write gap of the magnetic head and of the radius line of the magnetic disk are so small that conventional angle measuring devices are not capable of sensing the deviations.

2. Prior Art

At present, the alignment is generally performed by means of a microscope having a reticle. The magnetic gap, or an edge of the magnetic head previously made parallel to the magnetic gap, is aligned to the reticle by an operator looking through the microscope. The angle of deviation $d\theta$ is a function of the lateral deviation $dy$ of the edge to be adjusted. The angle of deviation varies according to the equation:

$$dy = \frac{1}{2} \times \text{length of edge } x \text{ arc } d\theta$$

It is therefore obvious that the edge lengths to be placed within the image field of a high magnification microscope only permits angular adjustments of relatively low precision.

If, for example, an edge has a length of 350 microns and is to be aligned to within ±0.5 degrees in parallel, the lateral displacements of the edge has to be detected within a precision of less than 1.5 microns. Although the measuring precision can be increased to a certain extent by a strong magnification, only part of the edge will be physically in the image field. The reticle must be repeatedly displaced along the length of the edge that is to be adjusted. This increases the measuring precision and permits adjustment within relatively close limits but the length of time involved to perform this test makes that check prohibitive.

It is, therefore, an object of the present invention to provide a method for measuring extremely small angles with a high precision without time consuming adjustments.

Complex optical systems using optical wedges has been used to measure the angular orientation of one body relative to another about an axis of rotation. Split images were produced in transposition of spaced-apart portions of a target reticle of the first body. The target reticle is optically split by the optical wedges or mirrors operating as a means of splitting the image of the target reticle into two halves. The complex optics used the optical deviation of the axis technique to accomplish the transposed halves of the target reticle.

It is, therefore, another object of the present invention to provide an apparatus for measuring the deviation angle of one body relative to another by using simple optical devices.

SUMMARY OF THE INVENTION

In accordance with the present invention, only the end zones of a target reticle such as an edge or a line of an article are rendered visible in the image field lying one along side the other. The lateral displacements to be measured for determining the angle can be observed by means of objectives with practically unlimited magnification. Further, the end zones of the edge can be further magnified electronically for reproduction on a television monitor.

The apparatus according to the present invention includes an intermediate image plane where an aperture can be provided for blanking the center part of the image of the target reticle. The images of end portions of the target reticle are projected in an evaluation plane via a lens system and a light beam splitting means and a reflecting means. The beam splitting means and the reflecting means are each inclined at a different angle from a common pivot line. The angular difference is such that the images from each do not touch. Only the end portion of the two images from the mirrors lies in the image field. The lateral spacing of these end portions is a function of the azimuth angle between the perpendicular to the pivot line and the target reticle.

Another object of the present invention therefore, is to provide enhanced optical apparatus for the detection of lateral displacements of a precision less than one minute of arc.

Another object of the present invention is to provide an enhanced apparatus for adjusting the angular displacement of a magnetic head relative to the radius line of a magnetic disk.

Yet another object is to provide an apparatus for automating the measuring of extremely small angles.

These and other objects of the present invention will become apparent to those skilled in the art as the description proceeds.

BRIEF DESCRIPTION OF THE DRAWING

The various novel features of this invention, along with the foregoing and other objects, as well as the invention itself both as to its organization and method of operation, may be more fully understood from the following description of illustrated embodiments when read in conjunction with the accompanying drawing, wherein:

FIGS. 1A–1C are a schematic representation of an optical device explaining the background of the invention with different positions of an arrow representing an image or target reticle line on an object;

FIGS. 2A–2C are a schematic representation of an optical device according to the present invention;

DESCRIPTION OF THE PREFERRED EMBODIMENTS

Figure 3A:
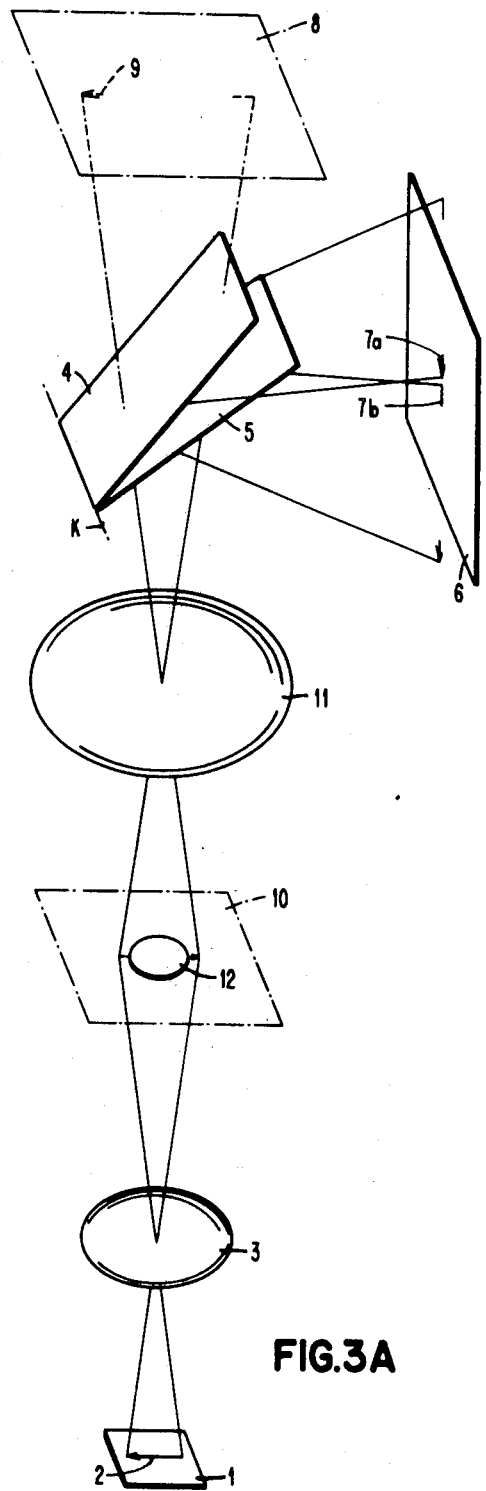
FIGS. 3A–3D are a schematic representation of another embodiment of the invention.

In order to fully explain the operation of the present invention, the optical laws on which the invention is based will first be specified. FIGS. 1A–1C show several different positions of an arrow which represents a target reticle line on an object such as a gap or edge of a magnetic head, together with the imaging of the arrow with straight and with a folded optical path. A line in an object plane 1 indicated by an arrow 2, is imaged by a lens 3 via a mirror 4 to appear in an image plane 6 as arrow 7. In the absence of mirror 4, an image 9 of the arrow 2 would appear at phantom image plane 8.

In the position depicted in FIG. 1A, the arrow 2 is positioned in the horizontal plane and its image in image plane 6 is the arrow 7 pointing upward vertically. If the arrow 2, as shown in FIG. 1B, is turned by 90°, its image in image plane 6 is the arrow 7 pointing to the front horizontally. Referring to FIG. 1C, if the arrow 2 is rotated by 45° in object plane 1, the image formed in image plane 6 shows the position of arrow 7 halfway between that shown in FIGS. 1A and 1B. The representation of images in the phantom image plane 8 as arrow 9 are intended to facilitate the understanding of the construction of the images.

The devices according to the present invention as shown in FIGS. 2A, 2B and 2C resemble the device of FIGS. 1A–1C, with the exception of the addition of a beam splitting means designated as a semi-transparent mirror 5. The beam splitter, semi-transparent mirror 5, is inclined at a different angle than mirror 4. The purpose of the semi-transparent mirror 5 is to provide two images of the arrow 2 to appear in image plane 6. The mirrors 4 and 5 are inclined from a common tilt axis K which is parallel to the image plane 6 and perpendicular to the arrow 2 of FIG. 1A. Thus when the arrow 2 is positioned in the object plane 1 in a position perpendicular to tilt axis K, an image is projected onto the image plane 6 by a lens 3 via the semi-transparent mirror 5 and mirror 4. The two images from the two mirrors appear on the image plane 6 as arrows 7a and 7b. The arrow images 7a and 7b lie in one common straight line when arrow 2 is transverse to the tilt axis K of mirror 4 and mirror 5. If the arrow 2 is placed parallel to the tilt axis K of the mirrors 4 and 5 of FIG. 2B, the images appear in the image plane 6 as parallel arrow images 7a and 7b. If arrow 2 is turned by an angle θ from the horizontal line in the object plane 1, as is shown in FIG. 2C, the two images on image plane 6 are displaced one above the other as depicted by arrows 7a and 7b. Similar considerations are of knowledge if the position of an arrow 2 is in the other angular direction displaced from the perpendicular line. Each arrow 7a and 7b is displaced from the perpendicular line by an angle θ. Thus the difference between the arrow 2 from the perpendicular line is exaggerated by the displacement from the arrow head of the arrow 7b to the trailing edge of the arrow 7a. As depicted in FIG. 2A, if the arrow 2 is positioned in line with a line perpendicular to the tilt axis K of the mirrors, the resultant arrow images 7a and 7b are exactly positioned head to tail of the arrows. A displacement from this transverse line results in the arrows being positioned at an angle. It should be evident that a gap of a magnetic head can be represented by the arrow 2 and the perpendicular line representing the radius line of a disk lying perpendicular to the tilt axis K.

A further refinement of the invention is illustrated in the embodiments shown in FIGS. 3A, 3B, 3C and 3D. In this embodiment the arrow 2 in object plane 1 is imaged in an intermediate image plane 10 via a first lens 3. The image from the intermediate image plane 10 is imaged via a second lens 11 and a beam splitter, semitransparent mirror 5, and reflecting mirror 4 onto an image plane 6. As with the mirrors of FIG. 2A–2C, the reflecting mirror 4 and the semi-transparent mirror 5 are tilted from a common axis K at a different angle such that two separate images appear in the image plane.

Figure 3B:
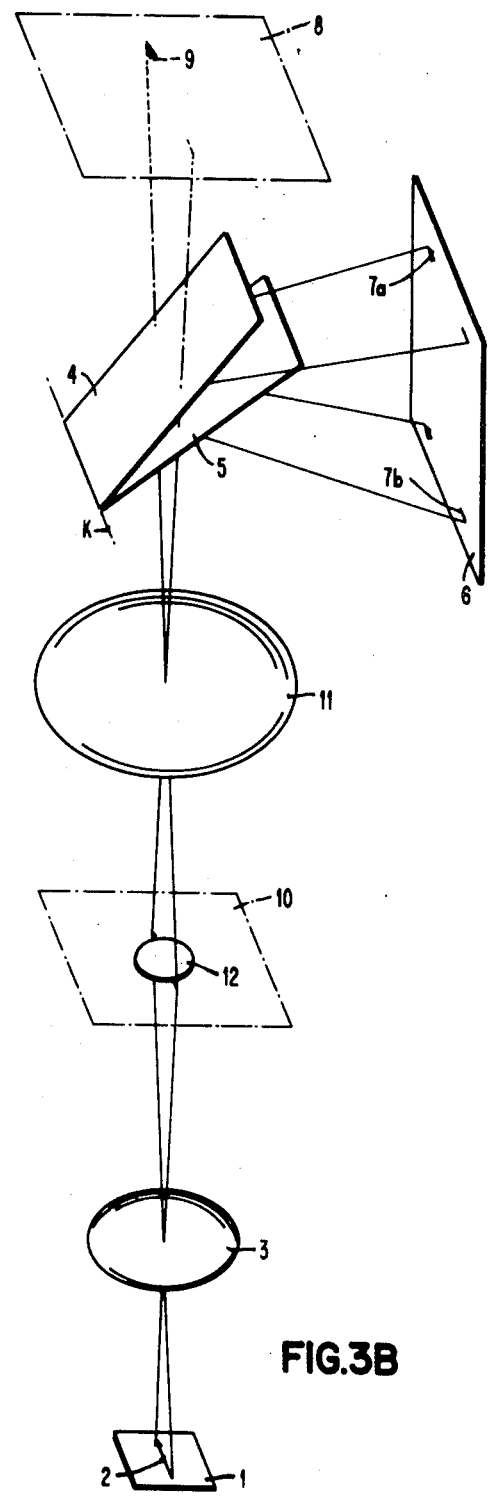

As shown in FIG. 3A and as represented by FIG. 2A previously, when the arrow 2 is exactly perpendicular to the tilt axis K of the mirrors, the images appearing in the image plane 6 are exactly vertical with the line represented by the arrows 7a and 7b pointing in line with the head of arrow 7a pointing exactly at the tail of arrow 7b. In the intermediate plane 10, a mask 12 is provided to blank out the middle range of the image of the arrow 2. The mask blanks out the center of the image of arrow 2 so that, in the absence of the mirrors 4 and 5, only the beginning and the end of the arrow would be imaged in image plane 8 as depicted by arrow 9. The angle between the totally reflecting mirror 4 and the semitransparent mirror 5 is such that the images of both ends of the arrow which are placed far apart in the assumed plane 8, are shifted together in image plane 6 owing to the coaction of the two mirrors 4 and 5. The lateral spacing of the images in image plane 6 is a function of the angle θ between the plane that is perpendicular to the tilt axis K and the position of the arrow 2 in the object plane 1. The difference angle θ is particularly easy to measure and estimate as shown in FIG. 3B.

Figure 3C:
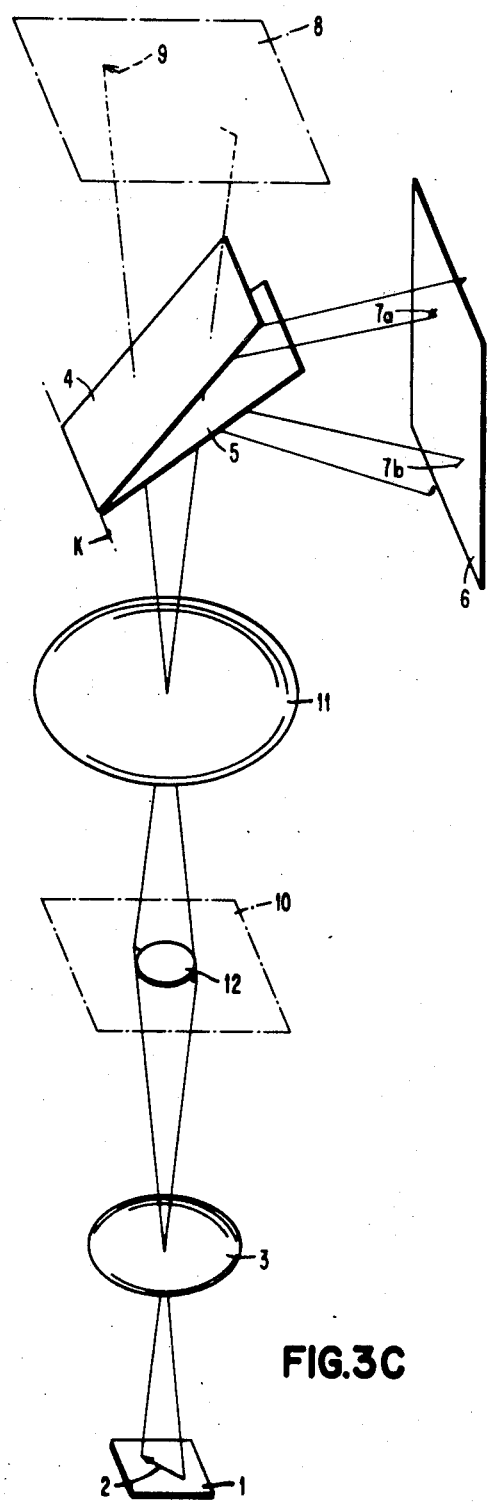
Figure 3D:
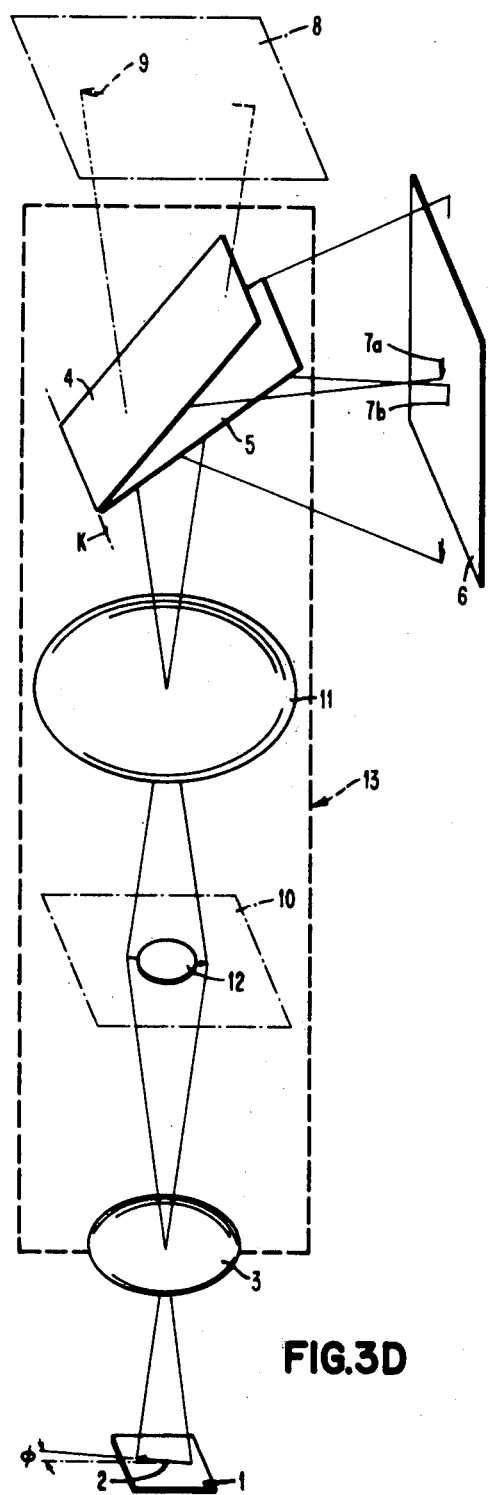

As the ratio of the arrow lengths imaged on image plane 6 can be made as small as desired, it is possible to increase the resolution of the two exclusively decisive parts of the shifted-together image of the two arrow ends 7a and 7b. If a horizontal scale is provided between the arrow head and the tail of the arrows 7a and 7b imaged in the plane 6 as shown in FIG. 3D, the scale can be calibrated directly in degrees of the angle θ formed by the arrow 2 and a plane that is perpendicular to the tilt axis K. With respect to the detailed description of FIGS. 3A–3D, reference is made to the description of FIGS. 1A–1C and FIGS. 2A–2C where corresponding elements show the same references. Thus, if the arrow 2 represents the gap or edge of a magnetic head and the perpendicular line depicts the radius of the magnetic disk, the embodiments according to the present invention can be used to precisely align the gap to the radius of the disk.

Figure 4:
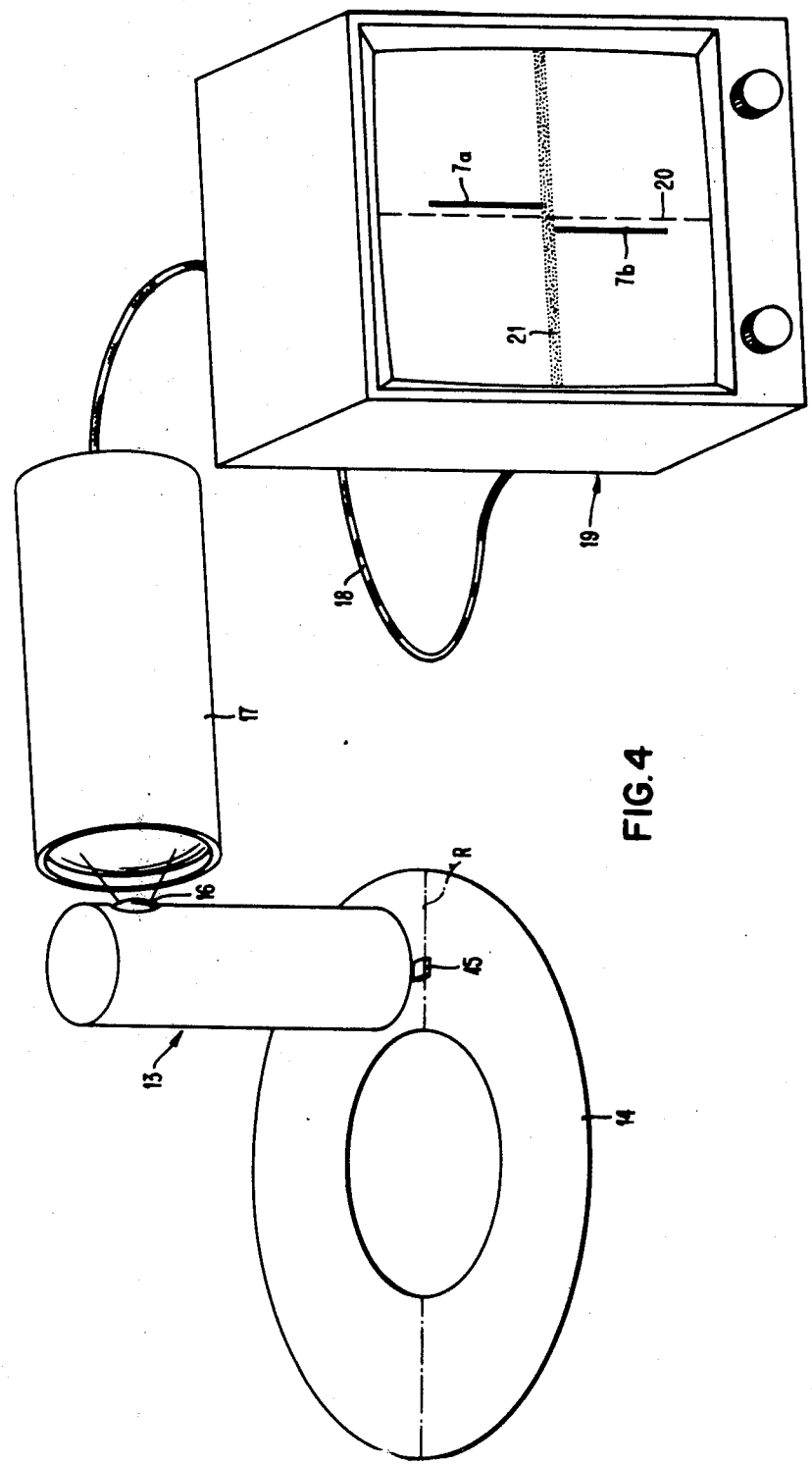
FIG. 4 illustrates an adaptation of the present invention to aligning a magnetic head relative to a radius line of a disk by the use of a television monitor.

The embodiment of FIG. 4 includes the device encompassed in FIG. 3D by the dashed lines 13. In FIG. 4, the device according to the present invention is shown testing the edge of a magnetic head 15 lying on a magnetic storage disk 14. The radius R of the disk 14 represents the horizontal line of the image plane and the edge of the magnetic head 15 represents the arrow 2 of the device shown in FIG. 3D. The optical system 13 is positioned such that the tilt axis K of the device is perpendicular to the radius R of the magnetic storage disk 14. The edge of the magnetic head 15 is imaged by the optical system 13 and via lens 16 onto the photocathode of a television camera tube 17. The output of the television camera tube 17 is connected via a cable 18 to a monitor 19. A magnified image of arrows 7a and 7b are formed on the camera tube 17 and displayed on the monitor screen. The position of the images 7a and 7b is shown on the screen represent the angle θ which is the angular difference between the radius R and the edge of the magnetic head 15. As shown by the description of the Figures, the lateral distance between the line elements 7a and 7b is a function of the angle θ. The angle θ is included by a plane vertical to the tilt axis K and by the line element, arrow 2 or a target reticle such as the edge of the magnetic head 15.

In order to align the edge of the magnetic head 15 exactly with the radius R, the magnetic head 15 is rotated on the vertical axis perpendicular to the tilt axis K until the line element 7a and 7b on the screen of the monitor 19 are exactly in line. In order to achieve the alignment a recticle represented by line 20 is provided. As previously discussed above, a scale calibrated in degrees of angle θ can be provided in the area shown by zone 21. By blanking out the center part of the image of the arrow 2 as illustrated in FIGS. 3A–3C, it is possible, by using the optical device according to the present invention, to provide an extremely high magnification and consequently an accurate measuring precision. The two ended elements of the target reticle are decisive for the measuring of the angular difference between the target reticle and a reference line. Only the two ends of the line are displayed for magnification. The entire length need not be displayed and thus the magnification is not limited by the image field. By suitably dimensioning the angle formed by the mirrors, it is possible to displace the images 7a and 7b immediately next to each other in such a manner that on the screen of the monitor they partly or entirely overlap in the area of zone 21. The alignment can then be obtained by overlaying one image with the other image. Therefore, as according to the optical device as disclosed in the present invention, only the end zones of an edge or of a line, or at least a zone spaced relatively far apart, are rendered visible, in the image field lying one beside the other. The lateral displacement to be measured for determining the angle can be observed by means of objectives with practically unlimited magnification. The observation, if necessary, can be subsequently further magnified electronically via a television scanning and reproduction on a television monitor.

The principles of the present invention have now been made clear in an illustrative embodiment. There will be immediately obvious to those skilled in the art many modification of structures, arrangement, proportion, the elements, materials and components used in the practice of the invention. For instance, it should be apparent that any object can be aligned with any plane and that the use of an arrow aligned with a reference line or the alignment of a magnetic head relative to a radius line of a disk should not be taken to narrow the present invention to these usages. It should further be apparent that image plane 6 can represent any viewing plane including a further optical magnification such as a plurality of lens to accomplish the invention according to the practice herein. The appended claims are, therefore, intended to cover and embrace any such modifications within the limits only of the true spirit and scope of the invention.

I claim:

1. An optical device for measuring the angular difference between a line and a reference direction on an object plane comprising:
    a. a mirror mounted to an axis perpendicular to the reference direction;
    b. a beam splitter mounted on the same axis as said mirror at a different angle therefrom; and
    c. means for imaging said line from said object plane onto said beam splitter and said mirror;
    d. wherein said angular difference between said mirror and said beam splitter reflects said line such that the axial distance of a first end of the line imaged by said beam splitter is reflected to an image plane adjacent to a second end of the line reflected by said mirror, the lateral distance between line images being proportional to the angle between the line and the reference direction.

2. An optical device as described in claim 1 further including:
    an intermediate image plane placed between the object plane and said beam splitter;
    second means for imaging said line from the object plane to said intermediate image plane; and
    a mask for blanking out the center portion of the line image from said intermediate image plane such that only the line end portions are imaged on said image plane.

3. An optical device as described in claim 1 wherein said beam splitter comprises a semi-transparent mirror.

4. An optical system as described in claim 2 wherein said image plane is a photocathode of a television camera wherein the first and second ends of the line are displaced on a television monitor.

5. An optical device for measuring the angular difference between a line and a reference direction on an object plane comprising:
    a. a mirror mounted to an axis perpendicular to the reference direction;
    b. a beam splitter mounted on the same axis as said mirror at a different angle therefrom;
    c. an image plane intervening the object plane and said beam splitter;
    d. a first lens imaging said line from said object plane onto said intervening image plane;
    e. a mask blanking out the center portion of the line image from said intervening image plane;
    f. a second lens imaging the line ends remaining from said blanked line image on said intervening image plane onto said beam splitter and mirror combination;
    g. wherein said angular difference between said mirror and said beam splitter reflects said line ends such that the axial distance of a first end of the line imaged by said beam splitter is reflected to a second image plane adjacent to a second end of the line reflected by said mirror; the lateral distance between line images being proportional to the angle between the line and the reference direction.

* * * * *